No. 669,383. Patented Mar. 5, 1901.
J. C. DONNELLY.
MACHINE FOR ASSEMBLING MATCH SPLINTS.
(Application filed Sept. 14, 1893.)

(No Model.) 2 Sheets—Sheet 1.

Witnesses: Jesse B. Heller. Harry L. Cheeseman.

Inventor. Joseph C. Donnelly, per John B. Nolan, Attorney.

THE NORRIS PETERS CO., PHOTO-LITHO., WASHINGTON, D. C.

No. 669,383. Patented Mar. 5, 1901.
J. C. DONNELLY.
MACHINE FOR ASSEMBLING MATCH SPLINTS.
(Application filed Sept. 14, 1893.)
(No Model.) 2 Sheets—Sheet 2.
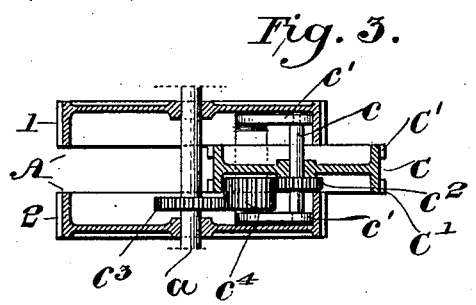
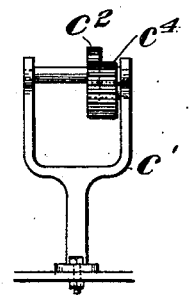
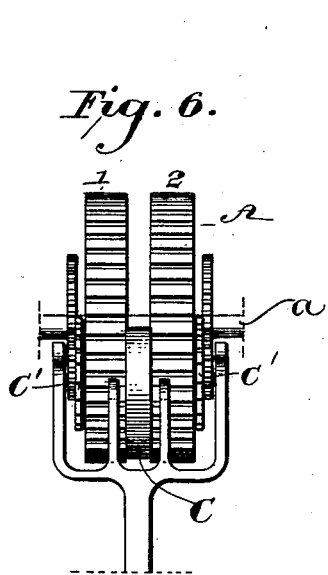
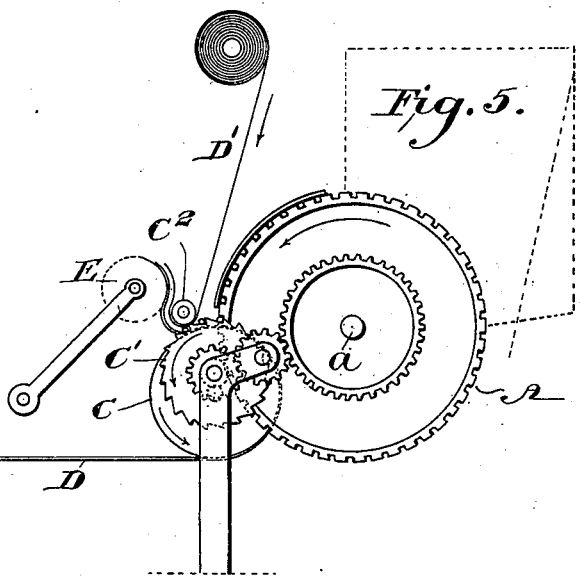
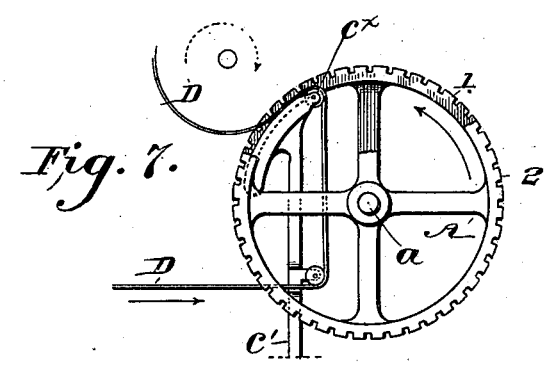
Witnesses:
Jesse B. Heller.
Harry L. Cheeseman
Inventor.
Joseph C. Donnelly
per John F. Nolan
Attorney

UNITED STATES PATENT OFFICE.

JOSEPH C. DONNELLY, OF PHILADELPHIA, PENNSYLVANIA.

MACHINE FOR ASSEMBLING MATCH-SPLINTS.

SPECIFICATION forming part of Letters Patent No. 669,383, dated March 5, 1901.

Application filed September 14, 1893. Serial No. 485,506. (No model.)

*To all whom it may concern:*

Be it known that I, JOSEPH C. DONNELLY, a citizen of the United States, residing in the city and county of Philadelphia, in the State of Pennsylvania, have invented certain new and useful Improvements in Machines for Bunching and Assembling Match-Splints, of which the following is a full, clear, and exact description, reference being had to the accompanying drawings, forming a part of this specification.

This invention relates to that class of machines for bunching match-splints in which the splints are conducted from the hopper to the bunching-spool by means of an interposed roller, around which passes a tape or webbing that, coacting with the said bunching-spool, takes up and assembles the splints in a coil.

The object of the present invention is to improve the general construction and operation of match-splint-bunching machines; and to this end the invention consists, first, in the provision of a two-part or centrally-divided feed-roller and an interposed bearing-surface for the bunching-tape, with which surface the bunching-spool coacts during the coiling of the match-splints; second, in the provision of a serrated or toothed transmitting wheel or wheels adapted to conduct the splints from the feed-roller to the bunching-spool, and, finally, in novel features of construction and organization of the several parts that will be hereinafter fully set forth and particularly claimed.

Figure 1:
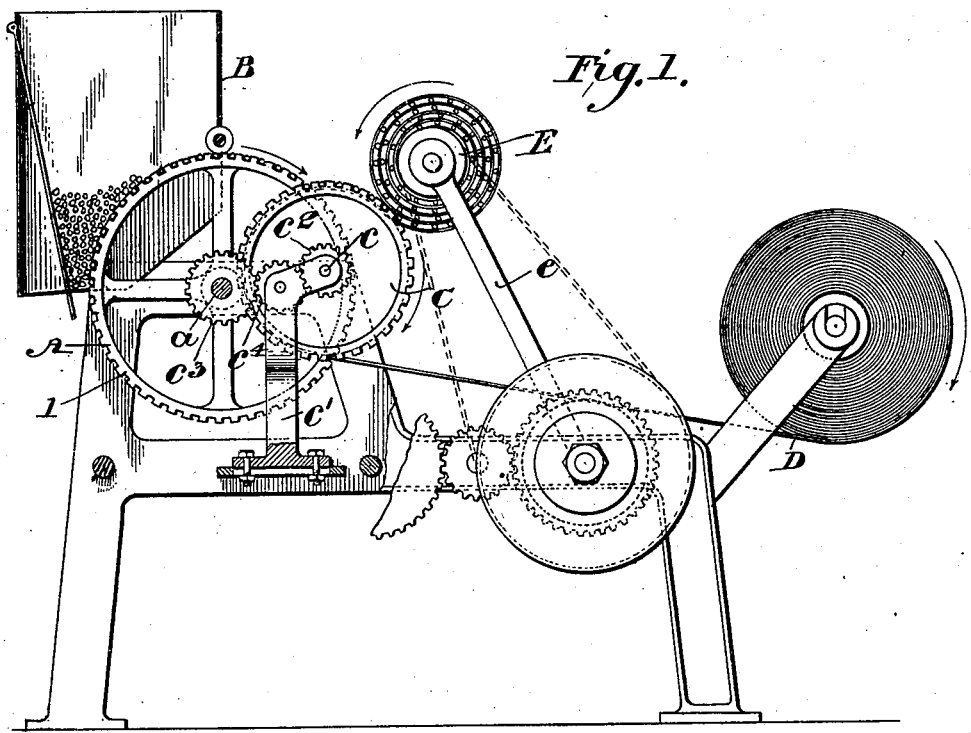
Figure 2:
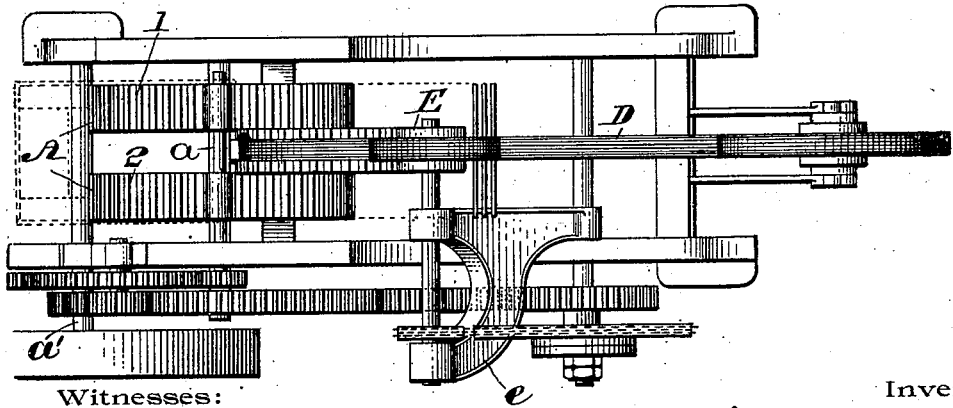

Referring to the annexed drawings, Figure 1 is a sectional elevation of a machine embodying my improvements. Fig. 2 is plan thereof. Fig. 3 is a horizontal section through the feed-roller and its adjuncts. Fig. 4 is a detail of the standard for supporting the gear devices within the feed-roller. Figs. 5 and 6 are partial side and end elevations, respectively, of a modification. Fig. 7 is a detail of another modification hereinafter referred to.

A represents the peripherally serrated or notched feed-roller that is adapted to convey the match-splints from the hopper B to the bunching-coil, which roller is mounted on a transverse shaft $a$, journaled in the sides of the framework. In the present instance the shaft is geared with a driving-shaft $a'$, to which motion is imparted from a suitable source of power. The notched feed-roller is made with two peripheral parts 1 2, which may be either separate sections affixed a suitable distance apart on the shaft $a$, or which may comprise a single roller with a circumferentially-divided periphery. Interposed between the two parts of the roller, so as to extend beyond the periphery of the latter, is a smaller roller C, around which is passed the tape D on its way to the bunching-spool E. The roller C is rotated in the same direction as the feed-roller, so as to impel the tape toward the bunching-spool, which tape, taking up the individual splints as they are deposited thereon by the feed-roller, assembles the splints in a coil. The spool E is supported in a rocking arm $e$, so as to bear forcibly upon the roller C during the bunching of the splints, and thereby to effect a firm binding of the splints between the adjacent coils of the tape. Said spool is rotated in the usual manner by suitable sprocket-gearing that is in turn actuated from the gear on the driving-shaft through the medium of an intermediate gear-train.

The shaft $c$ of the roller C is journaled in the bifurcated upper end of a standard $c'$, supported on a cross-bar of the main frame, this standard extending into the space between the two parts of the feed-roller. On the shaft $c$ is fixed a pinion $c^2$, to which motion is imparted from a gear $c^3$ on the shaft of the feed-roller through an intermediate idler $c^4$, thus rotating the tape-bearing roller in the proper direction, above mentioned.

In order to insure the disposition of the splints between the coils of the tape on the bunching-spool, I provide the periphery of the roller C on each side of the central or tape-bearing portion with toothed or serrated portions C', with the intermediate grooves or spaces of which the notches in the feed-roller are adapted to register successively. Hence the match-splints are deposited by the feed-roller in the grooves of the portions C' and thereupon conducted to the bunching-spool.

In Figs. 5 and 6 I have shown a modification of my invention, in which the tape-bearing roller rotates freely and independently of the toothed or serrated portions C', the latter in this construction being in the form of toothed disks disposed exteriorly of the feed-roller and positively actuated by means of the external gearing shown. In this figure I have also represented a second or additional splint-binding tape D', which, in conjunction with the tape D, passes under an interposed roller $C^2$ preparatory to being wound upon the spool E.

In Fig. 7 I have shown another modification of my invention, in which a stationary tape-bearing surface is substituted for the roller above described, this surface comprising a shoe supported between the two parts of the feed-roller relative to the bunching-spool by means of a standard $c'$. This shoe is provided with an antifriction-roller $c^x$, over which the tape passes on its way to the bunching-spool.

I claim as my invention—

1. In a machine for bunching or assembling match-splints, a hopper, a two-part or circumferentially-divided feed-roller, an independent tape-bearing surface interposed between the two parts of the roller, and a bunching-coil coacting with the said tape-bearing surface; substantially as described.

2. In a machine for bunching or assembling match-splints, a hopper, a two-part or circumferentially-divided feed-roller, an independent tape-bearing surface interposed between the two parts of the roller, a support for said tape-bearing surface extending into said roller, and a bunching-spool coacting with the said tape-bearing surface, substantially as described.

3. In a machine for bunching or assembling match-splints, a hopper, a two-part or circumferentially-divided feed-roller, a separate tape-bearing roller interposed between the two parts of the feed-roller, and a bunching-spool coacting with the said tape-bearing roller; substantially as described.

4. In a machine for bunching or assembling match-splints, a serrated two-part or circumferentially-divided feed-roller, a serrated transmitting-roller interposed between the same, a central tape-bearing surface, a bunching-coil coacting with said surface, and means for concertedly operating said feed and transmitting rollers; substantially as described.

5. In a machine for bunching or assembling match-splints, a two-part or circumferentially-divided feed-roller, a splint-transmitting and tape-bearing roller interposed between the same, means for positively rotating said rollers in the same direction, and a bunching-spool coacting with the tape-bearing roller; substantially as described.

6. In a machine for bunching or assembling match-splints, a two-part or circumferentially-divided feed-roller, a splint-transmitting roller interposed between the same, a central tape-bearing surface, a frame extending within the feed-roller for supporting said transmitting-roller, means for concertedly actuating the rollers, and a bunching-spool coacting with the tape-bearing surface; substantially as described.

In testimony whereof I have hereunto affixed my signature in the presence of two subscribing witnesses.

JOSEPH C. DONNELLY.

Witnesses:
JOHN R. NOLAN,
H. L. CHEESEMAN.